United States Patent [19]
Johnson

[11] Patent Number: 5,383,503
[45] Date of Patent: Jan. 24, 1995

[54] ROOTER GUIDE ASSEMBLY

[76] Inventor: Keith W. Johnson, 102 E. Aurora Rd., Northfield, Ohio 44067

[21] Appl. No.: 17,863

[22] Filed: Feb. 15, 1993

[51] Int. Cl.⁶ .............................................. B27M 3/00
[52] U.S. Cl. ........................ 144/144.5 R; 33/562; 144/144.5 GT; 144/372; 409/110; 409/130
[58] Field of Search .................. 33/197, 427, 429, 562; 144/144 R, 144.5, 144.5 GT, 137, 134 D, 136 C, 371, 372; 409/125, 130, 175, 178, 181, 182, 110

[56] References Cited
U.S. PATENT DOCUMENTS

| | | |
|---|---|---|
| 2,605,790 | 8/1952 | Schwarzer ........................ 144/144.5 |
| 2,652,866 | 9/1953 | Drain . |
| 3,099,299 | 7/1963 | Gilfry . |
| 3,130,760 | 4/1964 | Juneman ........................... 144/144.5 |
| 3,540,130 | 11/1970 | French . |
| 3,789,892 | 2/1974 | Converse et al. . |
| 3,860,050 | 1/1975 | Banks . |
| 4,274,459 | 6/1981 | Galajda . |
| 4,281,694 | 8/1981 | Gorman ............................. 409/182 |
| 4,299,263 | 11/1981 | Skinner . |
| 4,319,615 | 3/1982 | Ditmanson . |
| 5,040,580 | 8/1982 | Hufford . |

*Primary Examiner*—W. Donald Bray
*Attorney, Agent, or Firm*—Fay, Sharpe, Beall, Fagan, Minnich & McKee

[57] ABSTRACT

Apparatus for guiding the movement of a hand held router relative to a workpiece comprises a support forming an upwardly facing base adapted to underlie and support a workpiece to be routed. A plurality of parallel guide posts extend upwardly from the support and carry a rigid frame having an open central portion. The frame is mounted on the guide posts for guided sliding movement toward and away from the base to overlie a workpiece supported on the base. Springs bias the frame away from the base and clamps act to overcome the bias and clamp the frame into engagement with the uppermost surface of a workpiece supported on the base. A router guide template is removably connected in the open central portion of the rigid frame at a location to substantially engage the uppermost surface of a workpiece support on the base when the frame is clamped into engagement therewith.

7 Claims, 2 Drawing Sheets

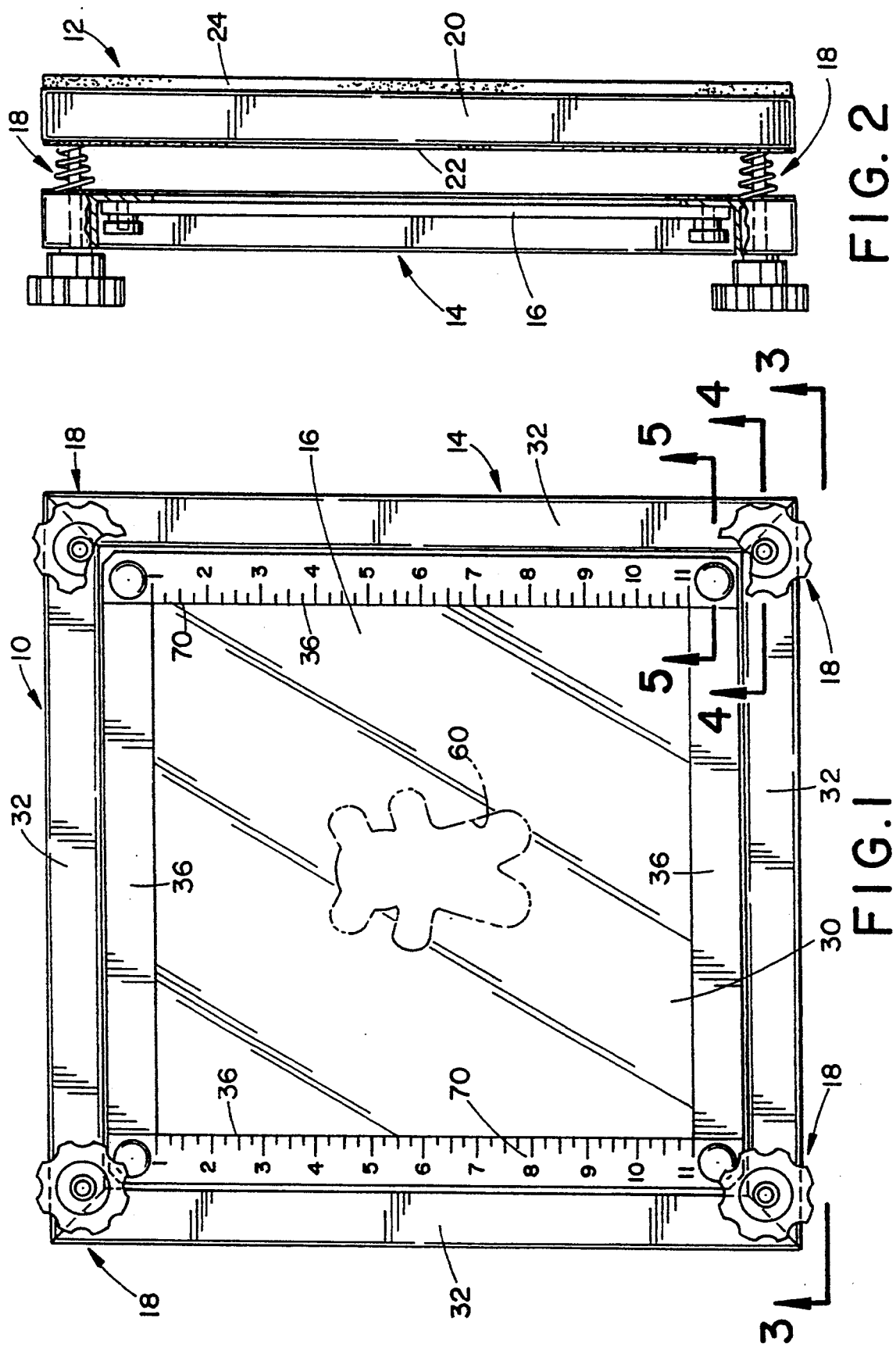

ROOTER GUIDE ASSEMBLY

BACKGROUND OF THE INVENTION

The subject invention is directed toward the art of routing guides and, more particularly, to an apparatus for clamping routing guide templates in selected positions on woods workpieces.

The high speed, hand-held router is widely used for putting ornamental designs on wood workpieces. The movement of the router over the workpiece is controlled either freehand or through the use of guide templates. Templates are used in order to control the router movement with greater precision and to allow repetitive reproduction of the same pattern.

Many different jigs and fixtures have been proposed for holding and positioning templates relative to the workpieces. These prior arrangements have, however, been inconvenient to use or have been unduly complex and expensive. Accordingly, there is an ongoing need for a simple and inexpensive template apparatus which is easy to use for rapid repetitive reproduction of decorative designs.

SUMMARY OF THE INVENTION

In accordance with the subject invention, there is provided apparatus for guiding the movement of a hand-held router relative to a workpiece. The apparatus generally includes support means which define an upwardly facing base adapted to underlie and support a workpiece which is to be routed. A plurality of parallel guide posts extend upwardly from the support means at widely spaced locations and a rigid frame having an open central portion is mounted on the guide posts for sliding movement toward and away from the base to overlie a workpiece supported on the base. Associated with the guide posts are biasing means which act to maintain a continual bias on the rigid frame in a direction away from the support means. Clamp means are provided for moving the rigid frame toward the base and clamping the frame into engagement with the uppermost surface of the workpiece supported on the base. A router guide template having a predetermined pattern formed therethrough is removably connected in the open central portion of the rigid frame at a location to substantially engage the uppermost surface of a workpiece supported on the base when the rigid frame is clamped into engagement therewith.

Preferably, the support means comprise a pair of elongated elements terminating in end portions and extending in side-by-side relationship with one of the guide posts located at each of the end portions.

Further, the rigid frame is generally rectangular and has four corner portions with openings are formed therethrough, and one of the guide posts is positioned to extend through each of the openings.

In accordance with a more limited aspect of the invention, the rectangular rigid frame includes inwardly extending flange elements which support the guide template and include means for clamping the guide element into located position on the flange elements.

The arrangement is such that the guide template is rapidly moved into located position on the workpiece surface merely by clamping the rigid frame toward the base and thereby firmly clamping the workpiece in located position beneath the template. The rigid frame, the base, and the guide template, together with the workpiece, thus form a unitary structure. Preferably, the base is provided with a non-slip lower surface, such as a high density foam, to assist in retaining the base in position on the workbench or table during a routing operation.

As can be seen from the foregoing, a primary object of the invention is the provision of a simple and easy to use guide assembly for hand-held routers.

A further object of the invention is the provision of an apparatus of the type described wherein the templates can be readily changed.

A still further object is the provision of an apparatus of the type described which is arranged such that the guide apparatus and the workpiece, including the template, are rigidly connected into an integral structure during use and which can be readily moved in the assembled condition.

A still further object is the provision of an apparatus of the type described wherein the templates can be readily changed while the assembly is clamped into position on the workpiece.

BRIEF DESCRIPTION OF THE DRAWINGS

The above and other objects and advantages will become apparent from the following description when read in conjunction with the accompanying drawings wherein:

FIG. 1 is a top plan view of a router guide apparatus formed in accordance with the preferred embodiment of the invention;

FIG. 2 is a side elevational view of the apparatus shown in FIG. 1;

DETAILED DESCRIPTION OF THE PREFERRED EMBODIMENT

Figure 3:
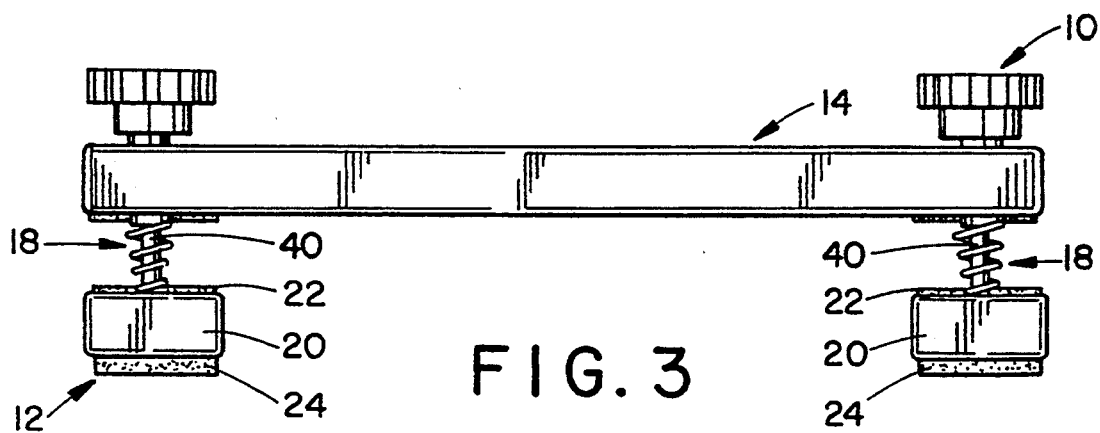
FIG. 3 is a front elevational view of the FIG. 1 apparatus (the view is taken on line 3—3 of FIG. 1)

Referring more particularly to the drawings wherein the showings are for the purpose of illustrating a preferred embodiment of the invention only, and not for the purpose of limiting same, FIGS. 1 through 3 best illustrate the overall arrangement of the subject invention wherein the guide assembly 10 generally comprises a base 12 above which is supported a rigid, upper frame assembly 14 which carries a removable guide template 16. As will subsequently be described in some detail, the upper frame is carried for selective movement toward and away from the base 12 on suitable post assemblies 18 which extend upwardly from the base 12.

The base 12 generally comprises a pair of elongated, rigid frame members 20 which are spaced as best seen in FIG. 3 and provide upwardly facing, base support surfaces 22 on which the workpiece to be routed rests during the routing operation. The members 20 could be formed from any suitable rigid structural material, for example, any wood, metal, or plastic having the desired physical characteristics could be used. In the subject embodiment, however, members 20 comprise extruded aluminum rectangular tubes which provide the necessary strength with relatively low weight. The ends of the members 20 are preferably closed by end plates or inserts to provide a pleasing closed end appearance.

Preferably, the lower surface or underside of the members 20 are provided with a strip of relatively high density foam material 24 having a comparatively high coefficient of friction so as to provide a non-slip base for the guide assembly. It should be appreciated, however, that other types of rubber feet, clamp assemblies, or the like could be provided to assure that the assembly stays in position on the underlying workbench or support surface during its use.

Also, associated with the base 12 and located on the top surfaces 22 is a suitable non-slip surface for engaging the underside of the workpiece so that it is firmly held in position during the routing operation. In the subject embodiment, non-slip surface comprises a layer of relatively coarse, abrasive paper or cloth 26 suitably bonded to surface 22.

The upper frame 14 is arranged to support the template 16 above the workpiece carried on the base surfaces 22. The frame 14 is preferably generally rectangular as shown and has an open center section 30 into which the template 16 is received. Like the base 12, the upper frame assembly 14 could be formed from any suitable structural materials having the required strength and rigidity. In the subject embodiment, however, the frame 14 is formed from suitable aluminum extrusions having the cross section best seen in FIG. 5. In particular, the frame 14 comprises four elongated side elements 32 which are joined at their ends in mitered corners, such as by welding or the like. Each of the side members 32 has the shape shown in FIG. 5 and comprises a generally rectangular, main body section 34 with a laterally extending flange 36. The members 32 are positioned so that the flange sections 36 extend inwardly about the bottom of central opening 30. The flanges 36 thus provide a support surface on which the template 16 is carried.

Figure 4:
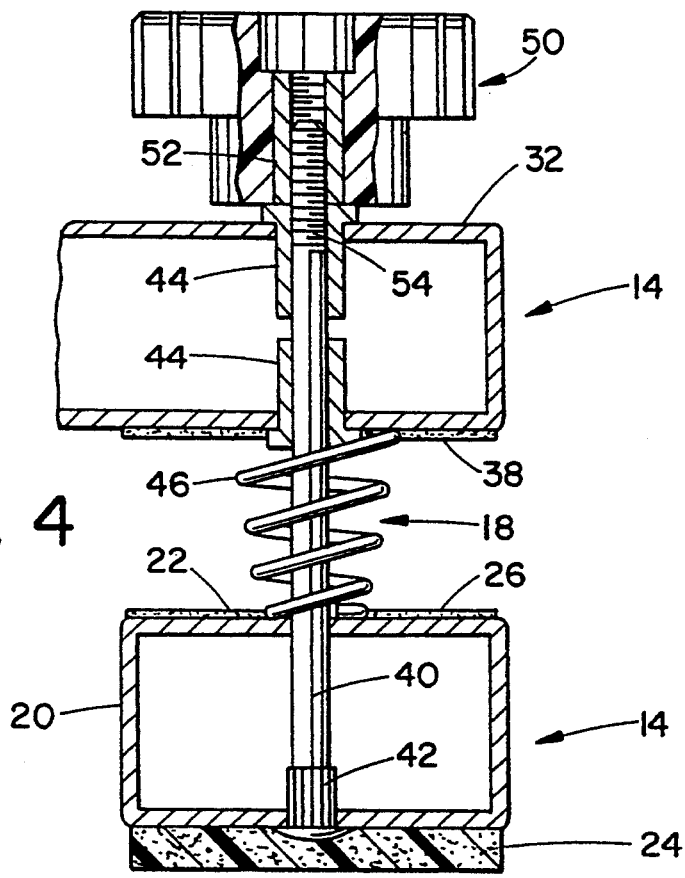
FIG. 4 is a greatly enlarged, cross-sectional view through a corner of the apparatus shown in FIG. 1 (the view is taken on line 4—4 of FIG. 1); and, FIG. 5 is a cross-sectional view taken on line 5—5 of FIG. 1.
Figure 5:
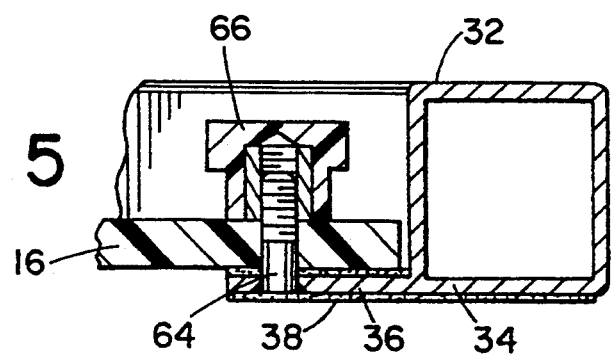

The relationship of template 16 to the upper frame 14 and the flanges 36 will subsequently be described. For the present, however, it is important to note that the frame assembly 14 is carried on the corner post assemblies 16 in a manner to allow it to be moved selectively toward and away from the base assembly 12 so as to be capable of clamping a workpiece positioned on surfaces 22 of base 12. To facilitate and improve the clamping ability of the upper frame assembly 14 relative to the base 12, it is preferable to have the under surface of the side members 32 and their respective flanges 36 provided with a high friction surface, such as a sheet or strip of abrasive paper or cloth 38, firmly bonded thereto as best shown in FIGS. 4 and 5.

As previously mentioned, the corner post assemblies 18 are arranged so that they carry the upper frame assembly 14 relative to the base 12 and permit the upper frame to be moved toward and away from the base member for workpiece clamping and release. The preferred form for the corner post assemblies 18 can best be seen in FIG. 4. As illustrated therein, each of the corner post assemblies 18 generally comprises a central, cylindrical bolt or shaft member 40 which extends upwardly through the end portion of the associated base element 20 and is preferably positively joined therein in a rigid fashion such as by being press fitted or welded therein. In the subject embodiment, each of the shaft members 40 have a head portion 42 which includes a serrated circumferential portion that is press fitted into member to provide a rigid, non-rotating connection therewith.

The individual corner posts rods or members 40 extend perpendicularly through the associated base members 20 and upwardly therefrom through guide openings formed generally at the corners of the rigid upper frame assembly 14. In the subject embodiment, the guide openings in the upper frame assembly 14 are provided by cylindrical inserts 44 which are press fitted or otherwise firmly connected into suitable openings formed through the members 32. The relationship between the inserts 44 and the rod members 40 is such as to allow relatively free sliding movement of the upper frame assembly on the corner posts members 40. Preferably, and in accordance with an aspect of the invention, the upper frame 14 is maintained in a continual, upwardly directed bias away from the base assembly 14 by coil spring members 46 located about the corner post element 40 and between the lower surface of frame assembly 14 and the upper surfaces 22 of the base members 20. Preferably, the spring arrangement is such as to act to move the upper frame assembly to an elevated position sufficient to allow the maximum normal thickness workpiece to be readily slid into the opening between the upper and lower frames until the upper frame is moved downward into clamping position on the workpiece.

The means for clamping the upper frame to the workpiece positioned between the upper frame and the lower frame comprise nut members 50 which include a threaded interior insert 52. These nut members 50 are threadedly received on the threaded outer end 54 of the corner post members 40. Thus, when a workpiece has been moved into position between the upper frame the lower support surfaces 22, tightening of the nut members 50 moves the upper frame down into clamping engagement with the lower frame and the entire upper frame and lower frame assembly, together with the workpiece, are locked into a rigid assembly.

As previously noted, the arrangement is such that the template carried on the upper frame 14 is then in position closely above the workpiece to guide a hand-held router through the desired pattern to form the desired pattern or design in the workpiece. In this regard, the template member 16 is, of course, provided with an open pattern (see FIG. 1), such as a teddy bear outline 60 formed through the template sheet and adapted to be engaged about its inner periphery by the router guide sleeve or cutter guide bearing in the well known and conventional manner to thereby guide the manual movement of the router.

The router guide template can, of course, be formed from any relatively thin and rigid sheet material having suitable strength characteristics and sufficiently rigid to act as a guide for manual manipulation of the router about the pattern opening 60. Preferably, and in accordance with an aspect of the subject device, the router template sheet 16 is formed from a rigid, clear plastic such as a polystyrene. It is preferable that the template be clear to allow precise positioning and locating of the workpiece there under during set up. The template sheet 16 is sized and arranged so that it can rest on the flange portions 36. Additionally, it is desirable that it be releasably fastened to the flanges so that there is no movement of the template sheet relative to the upper frame during use. For this reason, and as best seen in FIG. 5, suitable threaded stud elements 64 extend upwardly in each of corners of the upper frame assembly 14. Suitable threaded nut members or knobs 66 are adapted to be received on the upper end of each of the studs 64. Thus, by providing properly located openings in the template sheet 16, the template can be clamped by the nut members 66 into position on flanges 36 for use. Merely by releasing the nut members 66 and removing the template 16, a new template having a different pattern can be readily installed. This can be done even when the assembly is clamped in position on a workpiece. Thus, the same workpiece can be cut with several different patterns without movement of the workpiece but by merely changing the templates.

It should also be noted that suitable indicia, such as dimensions and guide marks 70 or the like, can be placed on the template support flanges for guiding placement of the workpieces during set up and for assisting in positioning of the router as desirable.

As can be seen from the foregoing, the subject arrangement is extremely simple in construction and provides a ready and easily used system for allowing a conventional, hand-manipulated router to be used for applying repetitive designs into workpieces.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. Apparatus for guiding the movement of a hand held router relative to a workpiece comprising:

support means defining an upwardly facing base adapted to underlie and support a workpiece to be routed;

a plurality of parallel guide posts extending upwardly from the support means at widely spaced locations;

a rigid frame having an open central portion, the rigid frame being mounted on the guide posts for guided sliding movement toward and away from the base to overlie a workpiece supported on the base;

biasing means associated with the guide posts for biasing the rigid frame away from the base;

clamp means adapted for moving the rigid frame toward the base and clamping the frame into engagement with the uppermost surface of a workpiece supported on the base; and, a router guide template having a predetermined pattern formed therethrough, the guide template being removably connected in the open central portion of the rigid frame at a location to substantially engage the uppermost surface of a workpiece support on the base when the rigid frame is clamped into engagement therewith.

2. The apparatus as defined in claim 1 wherein the support means comprises a pair of elongated elements terminating in end portions and extending in spaced side-by-side relationship with one of said guide posts located at each of said end portions.

3. The apparatus as defined in claim 1 wherein the rigid frame is generally rectangular with four corner portions and wherein there is an opening formed through each corner portion and one of said guide posts is positioned to extend through each said opening.

4. The apparatus as defined in claim 1 wherein the biasing means comprises a spring adjacent each guide post.

5. The apparatus as defined in claim 1 wherein the spring adjacent each guide post comprises a coil spring positioned about each guide post and extending between the base and the rigid frame.

6. The apparatus as defined in claim 1 wherein the clamp means comprise nut members threadedly mounted on the guide posts.

7. The apparatus as defined in claim 6 wherein the rigid frame includes flange portions on which the guide template rests.

* * * * *